United States Patent
Gerlach

(10) Patent No.: US 6,839,653 B2
(45) Date of Patent: Jan. 4, 2005

(54) METHOD FOR CORRECTING THE DETERMINATION OF THE ROTATIONAL POSITION OF A COMMUTATED DC MOTOR DRIVE SHAFT

(75) Inventor: Tobias Gerlach, Hagen (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/680,823

(22) Filed: Oct. 7, 2003

(65) Prior Publication Data

US 2004/0100250 A1 May 27, 2004

Related U.S. Application Data

(63) Continuation of application No. PCT/EP02/05879, filed on May 29, 2002.

(30) Foreign Application Priority Data

May 30, 2001 (DE) .......................................... 101 26 167

(51) Int. Cl.$^7$ ........................... G01C 17/00; G01P 3/46; G01B 7/30
(52) U.S. Cl. ....................... 702/151; 318/283; 318/565; 318/608; 702/84; 702/145; 388/809
(58) Field of Search .............................. 702/64–66, 75, 702/76, 78, 84, 145, 151; 318/254, 283, 466, 286, 565, 608; 324/160, 71.1; 388/809

(56) References Cited

U.S. PATENT DOCUMENTS

| | | | |
|---|---|---|---|
| 4,527,101 A | 7/1985 | Zavis et al. | |
| 4,744,041 A | 5/1988 | Strunk et al. | |
| 4,924,166 A | * 5/1990 | Roussel | ....................... 318/608 |
| 5,042,080 A | 8/1991 | Krüger | |
| 5,977,732 A | * 11/1999 | Matsumoto | .................. 318/283 |
| 6,144,179 A | 11/2000 | Kessler et al. | |
| 6,657,407 B2 | * 12/2003 | Lutter et al. | ................. 318/286 |

FOREIGN PATENT DOCUMENTS

| | | |
|---|---|---|
| DE | 38 11 046 A1 | 3/1988 |
| DE | 195 11 307 C1 | 3/1995 |
| DE | 197 29 238 C1 | 7/1997 |
| DE | 199 15 875 A1 | 4/1999 |
| EP | 1 043 590 A1 | 3/2000 |

* cited by examiner

Primary Examiner—John Barlow
Assistant Examiner—John Le
(74) Attorney, Agent, or Firm—Brooks Kushman P.C.

(57) ABSTRACT

A method for determining the position of an element driven by the drive shaft of a commutated direct current (DC) motor includes counting current ripples detected in an armature current signal as the motor rotatably drives the shaft. A frequency spectral analysis of the armature current signal is performed to determine frequency components of the armature current signal. The frequency components are analyzed to determine which of the frequency components is indicative of the current ripple frequency. The current ripple frequency is monitored for changes over time while the motor drives the shaft. The number of counted ripples is modified upon a change in the current ripple frequency in a time interval if the current ripple frequency change deviates from the current ripple frequency more than a threshold deviation for the time interval. The rotational position of the shaft is determined based on the modified number of counted ripples.

10 Claims, 2 Drawing Sheets

METHOD FOR CORRECTING THE DETERMINATION OF THE ROTATIONAL POSITION OF A COMMUTATED DC MOTOR DRIVE SHAFT

CROSS-REFERENCE TO RELATED APPLICATIONS

This is a continuation of International Application PCT/EP02/05879, published in German, with an international filing date of May 29, 2002, which claims priority to DE 101 26 167.5 filed on May 30, 2001.

BACKGROUND OF THE INVENTION

1. Field of the Invention

The present invention relates to a method for correcting a rotational position determination on the drive shaft of a commutated direct current (DC) motor by evaluating the current ripples contained in the armature current signal when either missed or double current ripples in the armature current signal occur.

2. Background Art

The armature current signal of a commutated DC motor includes a direct component and a ripple component superimposed on the direct component. The ripple component arises when the motor is operated as a consequence of the interaction of the magnet (field), the armature winding, and the commutator of the motor. This expresses itself in a transient change in the induced voltage which produces the ripple content in the armature current signal. The current peaks contained in the armature current signal—referred to below as current ripples—occur when the armature of the motor rotates.

The number of current ripples in a full revolution of the armature corresponds to the number of armature collector bars. For example, if the armature has ten collector bars then the armature current signal will have ten current ripples upon a full revolution of the armature. Thus, the number of counted current ripples is indicative of the actual rotational position of the motor's armature. Consequently, the counted current ripples is indicative of the position an element such as a motor vehicle window being driven by the motor along a predetermined travel segment.

In order to count the current ripples, the analog armature current signal is digitized. The number of current ripples counted in a certain time interval is the current ripple frequency. The current ripple frequency is indicative of the actual rotational speed of the motor.

To make it possible for current ripple detection to be performed with as few errors as possible, the analog armature current signal is conditioned before and possibly after digitization in order to suppress interference. Filtering is done to condition the armature current signal. The filtering may be in the form of low-pass filtering and/or frequency filtering.

For example, DE 195 11 307 C1 describes such a signal conditioning process. The purpose of such signal conditioning processes is to provide a precise armature current signal having minimal interference so that the current ripples contained in this conditioned armature current signal can be evaluated. To determine the position of the driven element, the current ripples in the conditioned armature current signal are counted. The counted result provides direct information regarding the actual rotational position of the drive shaft and the motor's armature. The current ripples contained in the armature current signal are usually counted using minima or maxima determination algorithms, or other algorithms to determine the zero crossings.

The previously known signal conditioning and correction processes can only sufficiently eliminate or minimize interference contained in the armature current signal if the current ripples contained in the armature current signal are distinct in the armature current signal. For this reason, sensorless position determination by means of the current ripple contained in the armature current signal is only done with DC motors which have high-quality collector bars and have been produced or processed in a correspondingly clean manner. Therefore, such sensorless position determination cannot be done with lower quality DC motors which have a distorted ripple component in the armature current signal.

However, it can happen that the armature current signal contains missed and/or double current ripples which falsify the current ripple counter result. Missed current ripples are current ripples which are not detectable in the armature current signal even though a rotational movement of the motor's armature took place. Double current ripples are current ripples which appear in the armature current signal as double peaks of a single current ripple, so that if both maxima are counted during a maxima count, the current ripple counter result is mistakenly incremented by an extra count.

For appropriate correction of the current ripple counter result when missed and/or double current ripples occur it is common for the signal conditioning and evaluation processes to have a downstream correction process. The correction process is intended to identify the occurrence of missed and/or double current ripples so that it is then possible to make the appropriate correction in the current ripple counter result. The use of such a process is necessary because these errors are caused by the commutator or other superimposed interference, e.g., the ripple content in a vehicle electrical system, and thus they cannot easily be eliminated by conditioning the armature current signal.

DE 197 29 238 C1, for example, discloses such a correction process. In this process, at the time point when a current ripple is detected, the actual value of the rotational motor speed, as determined from the motor current and characteristic data, is used to calculate the point in time when the detection of the next current ripple is expected. This point in time is part of a tolerance band which has a fixed size. Thus, the process disclosed in this document involves enlarging the calculated probable time point of the next commutation (current ripple) by the size of the specified tolerance band. Thus, the absence of a current ripple at or before the calculated time point is only identified as a missed ripple if a current ripple also has not been detected within the tolerance band. However, this process is computationally intensive.

SUMMARY OF THE INVENTION

Therefore, starting from the prior art, the present invention provides a method for correcting a determined position of an element driven by a direct current (DC) motor as determined from the armature current signal in which the method provides a reliable detection of any missed and/or double current ripples contained in the armature current signal using less computational effort than that required by the prior art.

The method of the present invention provides such a reliable detection of missed and/or double current ripples by performing the following steps. The method monitors the armature current signal during the operation of the motor in order to count identifiable current ripples contained in the armature current signal. The method may then make a determination of the position of an element driven by the motor along a predetermined travel segment and/or a determination of the rotational position of the drive shaft of the motor based on the number of counted current ripples.

The method then performs a frequency spectral analysis of the armature current signal in order to determine the frequency components contained in the armature current signal. The frequency spectral analysis converts the armature current signal from the time domain into the frequency domain. The method analyzes the frequency spectral analysis to determine the current ripple frequency. The current ripple frequency is the frequency of the current ripples contained in the armature current signal during operation of the motor. The method monitors the current ripple frequency as the motor operates in order to detect any abrupt changes in the current ripple frequency. If an abrupt change in the current ripple frequency is detected, then the method makes a correction to the number of counted current ripples. The method may then make a determination of the position of the driven element and/or a determination of the rotational position of the drive shaft based on the number of counted current ripples as corrected.

As now more fully explained, the method subjects the armature current signal to a frequency spectral analysis in order to determine the frequency components contained in the armature current signal. The frequency spectral analysis result shows that the current ripples have a certain frequency (i.e., the current ripple frequency) and a certain amplitude. The current ripple frequency is the frequency of the current ripples contained in the armature current signal during operation of the motor. The current ripple frequency is proportional to the actual rotational speed of the motor. As such, different current ripple frequencies correspond to respectively different rotational motor speeds. Accordingly, the current ripple frequency can be checked by calculating the current ripple frequency from the rotational motor speed as measured with other means and/or from the actual value of the motor current and motor characteristics.

The current ripple frequency occurring during operation of the motor can be determined in different ways. For example it is possible to rule out certain frequencies found in the spectral analysis, either because their amplitude is too small or because they correspond to a rotational motor speed that cannot be achieved by the motor. These ruled out frequencies can then be excluded from further processing. The actual value of the frequency of the current ripples contained in the armature current signal determined in this way during the operation of the motor is a direct measure of the actual value of the motor's rotational speed. The measured value of the motor's rotational speed can then be used to calculate the armature shaft's rotational angle and position, and subsequently, the position of an element driven by the motor along a travel segment.

Changes in the motor's operating state result in changes to the frequency of the current ripples contained in the armature current signal. Consequently, changes in the current ripple frequency can be attributed directly to a change in the rotational motor speed.

To perform the frequency spectral analysis, the analog armature current signal may be first digitized and then transformed into its frequency domain by means of a fast Fourier transform. These method steps can be designed not to be computationally intensive. This also has the consequence that it is easy to perform these calculations at every point in time of the digital sampling of the analog armature current signal so that the rotational angle of the motor's drive shaft can be determined with a high time resolution. Consequently, this method can also be used for correction processes which require the actual value of the motor's rotational speed. In particular, if the method steps are performed in step with the digital sampling, this method makes it possible to capture motor operational state changes virtually in real time, and thus also take them into consideration in determining the actual value of the rotational angle of the drive shaft and/or armature.

The method according to the present invention involves monitoring the current ripple frequency for abrupt changes. Missed and/or double current ripples cause an abrupt change in the actual value of the current ripple frequency. Thus, if such an abrupt current ripple frequency change is detected it is possible to make a correction in the current ripple counter result and thus make a correction to any position determination based on the current ripple counter result.

Detection of such an abrupt change in the actual value of the current ripple frequency can be subjected to a plausibility check, for example about the duration of the frequency change or about the frequency jump, in order to avoid, in this way, an interpretation of frequencies not induced by current ripple. Thus, the correction method of the present invention makes it simple to correct for missed and/or double current ripples without using costly and computationally intensive algorithms to detect the missed and/or double current ripples.

In contrast to the prior art, the method of the present invention does not perform any frequency filtering, but rather determines the actual value of the current ripple frequency directly by blanking out frequency components which might be superimposed on the armature current signal as interference. In this method, the observed current ripple frequency is evaluated directly without this theoretically requiring a separate prior current ripple detection or special signal conditioning. Therefore, this method is also suitable for making it possible to perform sensorless position determination of DC motors by taking advantage of the current ripple contained in the armature current while placing fewer requirements on the quality of the motors.

BRIEF DESCRIPTION OF THE DRAWINGS

The present invention is explained below once again using following figures:

FIG. 1b illustrates a plot of the frequency spectral analysis result of the armature current signal shown in FIG. 1a;

FIG. 2b illustrates a plot of the frequency spectral analysis result of the armature current signal shown in FIG. 2a.

DETAILED DESCRIPTION OF THE PREFERRED EMBODIMENT(S)

Figure 1A:
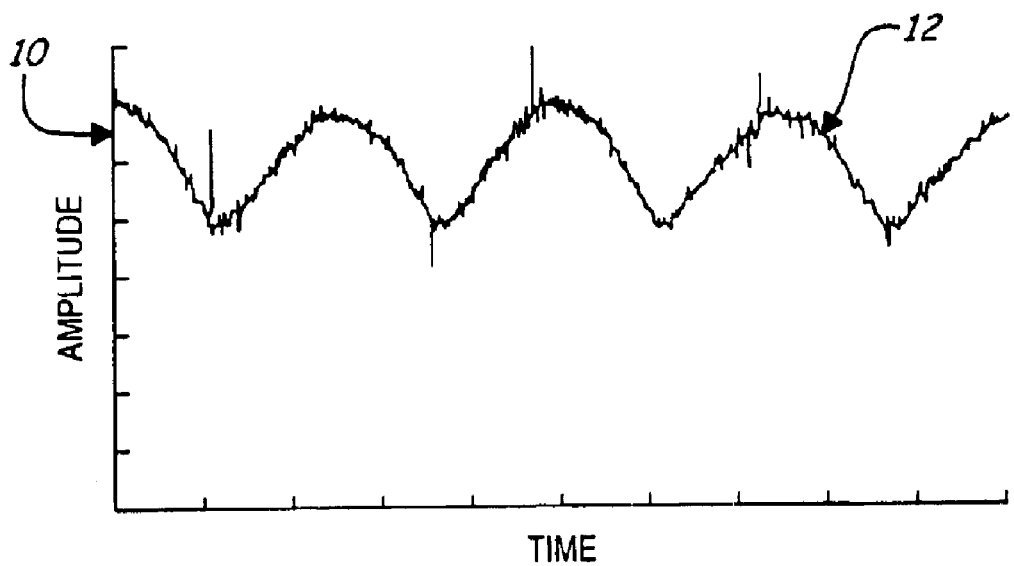
FIG. 1a illustrates a plot of the armature current signal of a commutated direct current (DC) motor as a function of time, the armature current signal having current ripples and relatively minimal superimposed interference.

FIG. 1a illustrates a plot of the armature current signal produced during the operation of a commutated direct current (DC) motor as a function of time. The plotted armature current signal 12 has current ripples and relatively minimal superimposed interference. The current ripples form the wavy shape of the plotted armature current signal 12. The frequency of the current ripples in armature current signal 12 is proportional to the motor's rotational speed. As such, the current ripple frequency increases with increasing rotational motor speed and vice versa.

Figure 1B:
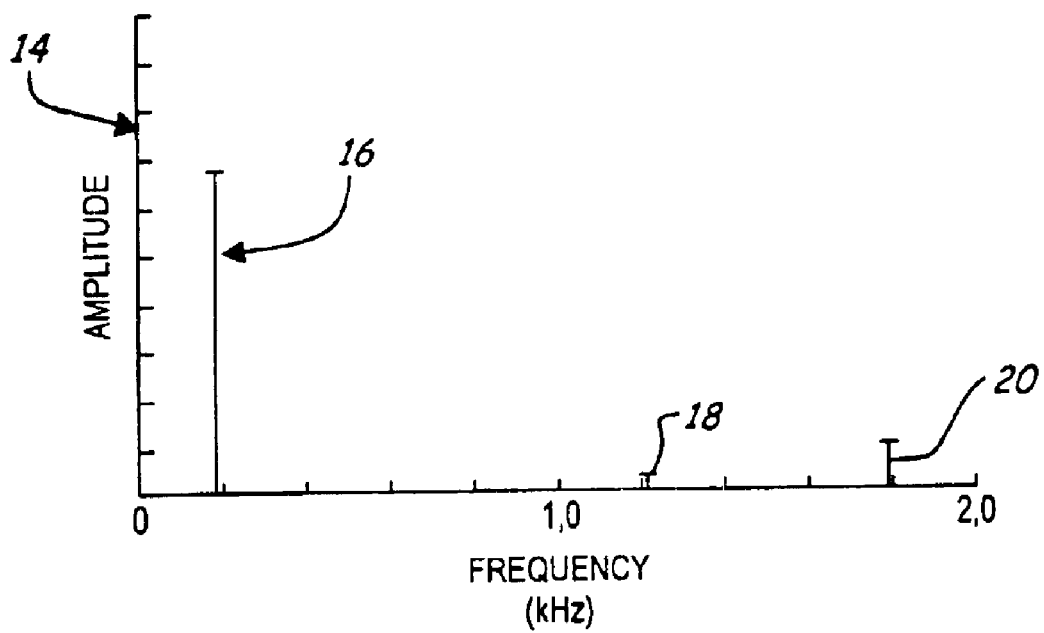

Armature current signal 12 is digitally sampled and then subjected to a fast Fourier transform. The fast Fourier transform transforms armature current signal 12 from the time domain into the frequency domain in order to determine the frequency components contained in the armature current signal. FIG. 1b illustrates a plot 14 of the frequency spectral analysis result of armature current signal 12. Plot 14 illustrates the frequency components contained in armature current signal 12. These frequency components include a current ripple frequency component 16 and other interference frequency components 18 and 20.

According to this frequency spectral analysis, the armature current signal 12 includes three overlapping frequencies 16, 18, and 20. The two high frequency components 18 and 20 located at about 1.2 kHz and 1.8 kHz would not be considered current ripple on the basis of their amplitude alone. Rather, these two frequencies 18 and 20 reflect the interference and fluctuation in the armature current signal which is visible in plotted armature current signal 12 as shown in FIG. 1a. The current ripple frequency is about 0.2 kHz which can also be seen in the frequency spectral analysis of FIG. 1b on the basis of the pronounced amplitude. That the frequencies 18 and 20 are not current ripple frequencies is also apparent from the fact that the motor producing armature current signal 12 could not achieve a rotational motor speed which would produce the frequencies 18 and 20.

Figure 2A:
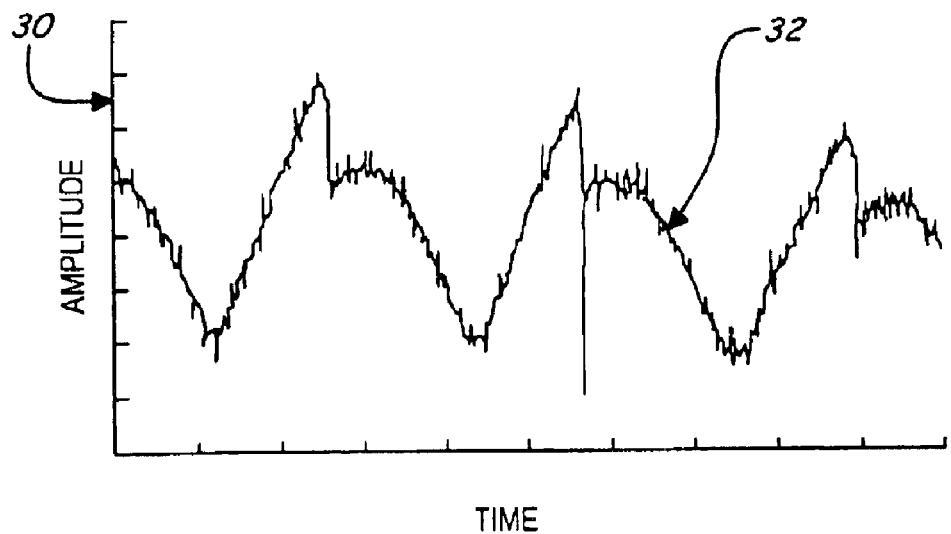
FIG. 2a illustrates a plot of the armature current signal of the DC motor as a function of time, the armature current signal having current ripples and relatively more superimposed interference.
Figure 2B:
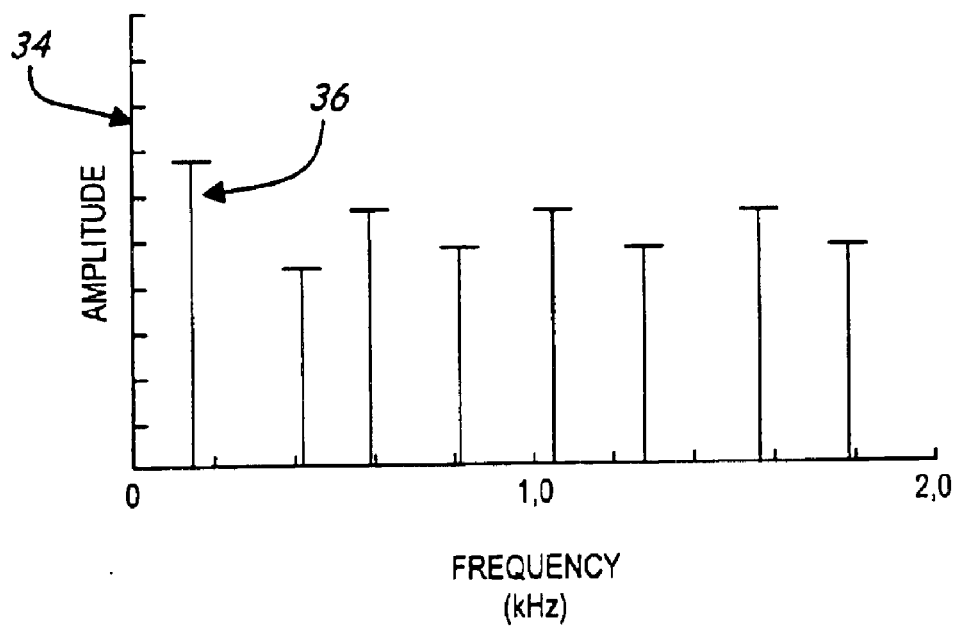

FIGS. 2a and 2b are corresponding illustrations of the time and frequency domains of the armature current signal of another commutated DC motor. FIG. 2a illustrates a plot 30 of the armature current signal 32 produced during the operation of the DC motor as a function of time. The plotted armature current signal 32 has current ripples and relatively more superimposed interference. Digitizing armature current signal 32 and then transforming it into the frequency domain produces the plot 34 of the frequency spectrum shown in FIG. 2b.

Frequency spectrum plot 34 has a number of different frequencies which make up armature current signal 32. A prior definition of the current ripple frequency—performed when the system was calibrated, for example—indicates that at the rotational motor speed shown in FIGS. 2a and 2b the current ripple frequency 36 is about 0.15 kHz. An evaluation of the frequency spectrum for a changing rotational motor speed to determine the position of the drive shaft will then observe exclusively this frequency. The other frequencies do not enter into the further evaluation.

Changes in the current ripples which reflect operational changes in the rotational speed of the motor express themselves as gradual changes in the current ripple frequency. Interference superimposed on the current ripple frequency remains unaffected by such changes. Interference caused by the commutator also changes its frequency when the rotational motor speed changes so that in theory this interference can also be observed.

If either missed or double current ripples occur, the current ripple frequency changes abruptly so that this can also be detected with the method of the present invention. Missed and double current ripples appear for only a short time and can be identified in the interference spectrum on the basis of this property, for example.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for determining the position of an element driven by the drive shaft of a commutated direct current (DC) motor, the method comprising:

detecting current ripples contained in an armature current signal of the motor as the motor drives the drive shaft;

counting the detected current ripples;

performing a frequency spectral analysis of the armature current signal in order to determine frequency components of the armature current signal;

analyzing the frequency components identified in the frequency spectral analysis of the armature current signal in order to determine which of the frequency components of the armature current signal is indicative of the frequency of the current ripples contained in the armature current signal;

monitoring the current ripple frequency for changes over time while the motor drives the drive shaft;

modifying the number of counted current ripples upon a change in the current ripple frequency in a given time interval if the change in the current ripple frequency deviates from the current ripple frequency more than a threshold deviation for the given time interval; and determining the rotational position of the drive shaft based on the modified number of counted current ripples.

2. The method of claim 1 wherein the armature current signal is an analog armature current signal, the method further comprising:

digitizing the analog armature current signal;

wherein performing a frequency spectral analysis of the armature current signal includes performing a frequency spectral analysis of the digitized armature current signal.

3. The method of claim 1 wherein:

performing the frequency spectral analysis of the armature current signal includes using a fast Fourier transform in order to determine the frequency components of the armature current signal.

4. The method of claim 1 wherein the armature current signal is an analog armature current signal, the method further comprising:

digitizing the analog armature current signal at sampling time points;

wherein each method step is performed at each sampling time point.

5. The method of claim 1 wherein:

monitoring the current ripple frequency for changes over time while the motor drives the drive shaft includes comparing the current ripple frequency at a given sampling time point with the current ripple frequency at a previously sampled time point.

6. A method for determining the position of an element driven by the drive shaft of a commutated direct current (DC) motor, the method comprising:

performing a frequency spectral analysis of an armature current signal of the motor as the motor rotatably drives the drive shaft in order to determine frequency components of the armature current signal;

analyzing the frequency components identified in the frequency spectral analysis of the armature current signal in order to determine which of the frequency components of the armature current signal is indicative of the frequency of current ripples contained in the armature current signal;

determining rotational speed of the drive shaft as a function of the current ripple frequency;

determining rotational position of the drive shaft as a function of the rotational speed of the drive shaft;

monitoring the current ripple frequency for changes over time while the motor drives the drive shaft;

modifying the determined rotational position of the drive shaft as a function of a change in the current ripple frequency.

7. The method of claim 6 wherein the armature current signal is an analog armature current signal, the method further comprising:

digitizing the analog armature current signal;

wherein performing a frequency spectral analysis of the armature current signal includes performing a frequency spectral analysis of the digitized armature current signal.

8. The method of claim 6 wherein:

performing the frequency spectral analysis of the armature current signal includes using a fast Fourier transform in order to determine the frequency components of the armature current signal.

9. The method of claim 6 wherein the armature current signal is an analog armature current signal, the method further comprising:

digitizing the analog armature current signal at sampling time points;

wherein each method step is performed at each sampling time point.

10. The method of claim 6 wherein:

monitoring the current ripple frequency for changes over time while the motor drives the drive shaft includes comparing the current ripple frequency at a given sampling time point with the current ripple frequency at a previously sample time point.

* * * * *